US009955000B2

(12) United States Patent
Xue et al.

(10) Patent No.: US 9,955,000 B2
(45) Date of Patent: Apr. 24, 2018

(54) METHOD AND APPARATUS FOR PRECLUSION OF CAUSATION OF RENDERING OF A NOTIFICATION AT A NOTIFICATION TIME

(71) Applicant: Nokia Technologies Oy, Espoo (FI)

(72) Inventors: Chaomin Xue, Beijing (CN); Zhenghao Jiang, Shandong (CN); Le Chen, Beijing (CN); Shiwei Bai, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/110,574

(22) PCT Filed: Jan. 17, 2014

(86) PCT No.: PCT/CN2014/070784
§ 371 (c)(1),
(2) Date: Jul. 8, 2016

(87) PCT Pub. No.: WO2015/106431
PCT Pub. Date: Jul. 23, 2015

(65) Prior Publication Data
US 2016/0330310 A1    Nov. 10, 2016

(51) Int. Cl.
*G04B 47/00* (2006.01)
*H04M 1/725* (2006.01)
(Continued)

(52) U.S. Cl.
CPC ...... *H04M 1/72566* (2013.01); *G06Q 10/109* (2013.01); *G08B 5/222* (2013.01); *G08B 21/24* (2013.01); *H04M 1/72569* (2013.01)

(58) Field of Classification Search
CPC .......... H04M 1/72566; H04M 1/72569; G06Q 10/109; G08B 5/222; G08B 21/24
(Continued)

(56) References Cited

U.S. PATENT DOCUMENTS 7,333,776 B1 * 2/2008 York ............................ 455/90.1
8,050,665 B1 * 11/2011 Orbach ........................ 455/418
(Continued)

FOREIGN PATENT DOCUMENTS

CN        1744637         3/2006
CN       101119425        2/2008
(Continued)

OTHER PUBLICATIONS

International Search Report and Written Opinion received for corresponding Patent Cooperation Treaty Application No. PCT/CN2014/070784, dated Oct. 24, 2014, 12 pages.
(Continued)

*Primary Examiner* — Brent Swarthout
(74) *Attorney, Agent, or Firm* — Alston & Bird LLP (57) ABSTRACT

A method comprising determining that a current time is within a pre-notification possession time period associated with an apparatus possession alarm, the apparatus possession alarm being associated with an apparatus, and the pre-notification possession time period being a duration of time prior to a notification time associated with the apparatus possession alarm, receiving motion information indicative of movement of the apparatus, and precluding causation of rendering of a notification at the notification time based, at least in part, on the receipt of the motion information is disclosed.

18 Claims, 6 Drawing Sheets

(51) Int. Cl.
 *G06Q 10/10* (2012.01)
 *G08B 5/22* (2006.01)
 *G08B 21/24* (2006.01)

(58) Field of Classification Search
 USPC .......... 340/309.7, 309.8, 457, 539.11, 568.1,
 340/568.6, 568.7, 571, 572.1, 309.16;
 368/10, 244
 See application file for complete search history.

(56) References Cited

U.S. PATENT DOCUMENTS

| | | | |
|---|---|---|---|
| 2006/0258407 A1* | 11/2006 | Chien | G08B 21/24 455/567 |
| 2007/0263490 A1 | 11/2007 | Choi et al. | |
| 2009/0117848 A1* | 5/2009 | Nagata | H04W 8/005 455/41.2 |
| 2011/0074558 A1 | 3/2011 | Miura | |

FOREIGN PATENT DOCUMENTS

| | | |
|---|---|---|
| CN | 101692183 | 4/2010 |
| CN | 103051770 | 4/2013 |

OTHER PUBLICATIONS

Extended European Search Report for Application No. EP 14 87 9039 dated Sep. 18, 2017, 7 pages.
Shake Alarm [online] [retrieved Sep. 22, 2017]. Received from the Internet: <URL: https://web.archive.org/web/20130928131247/https://play.google.com/store/apps/details?id=com.ejclabs.shakealarm>. (dated Sep. 28, 2013) 3 pages.
Anti Theft Alarm [online] [retrieved Sep. 22, 2017]. Received from the Internet: <URL: https://web.archive.org/web/20160412152223/http://mmappsmobile.com/app/anti-theft-alarm/>. (dated Apr. 12, 2016) 3 pages.
The Best Alarm Clock App for Android [online] [retrieved Sep. 22, 2017]. Received from the Internet: <URL: https://web.archive.org/web/20160630194503/http://lifehacker.com/5860365/the-best-alarm-clock-app-for-android>. (dated Jul. 20, 2015) 9 pages.

* cited by examiner

METHOD AND APPARATUS FOR PRECLUSION OF CAUSATION OF RENDERING OF A NOTIFICATION AT A NOTIFICATION TIME

RELATED APPLICATION

This application was originally filed as PCT Application No. PCT/CN2014/070784 filed Jan. 17, 2014.

TECHNICAL FIELD

The present application relates generally to preclusion of causation of rendering of a notification at a notification time based, at least in part, on receipt of motion information.

BACKGROUND

As electronic apparatuses become more prevalent and more pervasive in society, users of electronic apparatus have become increasing reliant upon their electronic apparatus. For example, a user of an electronic apparatus may utilize the electronic apparatus for purposes relating to navigation, scheduling, entertainment, communication, and/or the like. In many circumstances, it may be desirable to ensure that a user of an electronic apparatus is in possession of the electronic apparatus.

SUMMARY

Various aspects of examples of the invention are set out in the claims.

One or more embodiments may provide an apparatus, a computer readable medium, a non-transitory computer readable medium, a computer program product, and a method for determining that a current time is within a pre-notification possession time period associated with an apparatus possession alarm, the apparatus possession alarm being associated with an apparatus, and the pre-notification possession time period being a duration of time prior to a notification time associated with the apparatus possession alarm, receiving motion information indicative of movement of the apparatus, and precluding causation of rendering of a notification at the notification time based, at least in part, on the receipt of the motion information.

One or more embodiments may provide an apparatus, a computer readable medium, a computer program product, and a non-transitory computer readable medium having means for determining that a current time is within a pre-notification possession time period associated with an apparatus possession alarm, the apparatus possession alarm being associated with an apparatus, and the pre-notification possession time period being a duration of time prior to a notification time associated with the apparatus possession alarm, means for receiving motion information indicative of movement of the apparatus, and means for precluding causation of rendering of a notification at the notification time based, at least in part, on the receipt of the motion information.

In at least one example embodiment, the receipt of motion information indicative of movement of the apparatus occurs prior to the notification time.

In at least one example embodiment, the motion information is distinct from a notification termination input.

One or more example embodiments further perform determination that a user has possession of the apparatus based, at least in part, on the receipt of the motion information. In such an example embodiment, the preclusion of causation of rendering of the notification at the notification time may be based, at least in part, on the determination that the user has possession of the apparatus.

In at least one example embodiment, the pre-notification time period is associated with a pre-notification time period start time.

One or more example embodiments further perform determination that another current time is within another pre-notification possession time period associated with another apparatus possession alarm, the other apparatus possession alarm being associated with the apparatus, and the other pre-notification possession time period being a duration of time prior to another notification time associated with the other apparatus possession alarm, determination that the other pre-notification possession time period has elapsed absent receipt of another motion information indicative of another movement of the apparatus, and causation of rendering of another notification at the other notification time based, at least in part, on the determination that the other pre-notification possession time period has elapsed absent receipt of the other motion information.

One or more example embodiments further perform receipt of information indicative of an apparatus possession alarm enablement input. In such an example embodiment, the causation of rendering of the other notification at the other notification time may be based, at least in part, on the apparatus possession alarm enablement input.

One or more example embodiments further perform receipt of information indicative of a notification termination input subsequent to causation of rendering of the other notification, and causation of termination of rendering of the other notification based, at least in part, on the notification termination input.

In at least one example embodiment, the notification termination input is distinct from the other motion information.

One or more example embodiments further perform receipt of different motion information indicative of a different movement of the apparatus subsequent to causation of rendering of the other notification, and causation of termination of rendering of the other notification based, at least in part, on the receipt of the different motion information.

One or more example embodiments further perform determination that a user has possession of the apparatus based, at least in part, on the receipt of the different motion information, wherein the causation of termination of rendering of the other notification is based, at least in part, on the determination that the user has possession of the apparatus.

One or more example embodiments further perform initiation of motion information monitoring based, at least in part, on the determination that a current time is within a pre-notification possession time period.

One or more example embodiments further perform termination of motion information monitoring based, at least in part, on the receipt of the motion information.

One or more example embodiments further perform receipt of information indicative of an apparatus possession alarm cancellation input.

One or more example embodiments further perform causation of display of at least one notification time selection interface element, receipt of information indicative of a notification time selection input associated with the notification time selection interface element, wherein the notification time is based, at least in part, on the notification time selection input, receipt of information indicative of a notification time acceptance input, and causation of storage of the notification time based, at least in part, on the notification time acceptance input.

One or more example embodiments further perform causation of display of a notification time acceptance interface element in relation to the notification time selection interface element. In such an example embodiment, the notification time acceptance input may be at a position that corresponds with a position of the notification time acceptance interface element.

One or more example embodiments further perform causation of display of at least one pre-notification possession time period selection interface element, receipt of information indicative of a pre-notification possession time period selection input associated with the pre-notification possession time period selection interface element, wherein the pre-notification possession time period is based, at least in part, on the pre-notification possession time period selection input, receipt of information indicative of a pre-notification possession time period acceptance input, and causation of storage of the pre-notification possession time period based, at least in part, on the pre-notification possession time period acceptance input.

One or more example embodiments further perform causation of display of a pre-notification possession time period acceptance interface element in relation to the pre-notification possession time period selection interface element. In such an example embodiment, the pre-notification possession time period acceptance input may be at a position that corresponds with a position of the pre-notification possession time period acceptance interface element.

One or more example embodiments further perform receipt of information indicative of an apparatus possession alarm enablement input, and causation of storage of the apparatus possession alarm in memory such that the apparatus possession alarm is associated with the notification time and the pre-notification possession time period.

In at least one example embodiment, the pre-notification possession time period is a duration of time during which receipt of the motion information indicative of the movement of the apparatus causes, at least in part, the preclusion of causation of rendering of the notification at the notification time.

In at least one example embodiment, the pre-notification possession time period is a duration of time during which a user of the apparatus is expected to possess the apparatus.

In at least one example embodiment, the pre-notification possession time period is a duration of time during which a user of the apparatus is expected to come into possession of the apparatus.

In at least one example embodiment, the motion information is received by way of at least one motion sensor comprised by the apparatus.

In at least one example embodiment, the motion sensor is at least one of an accelerometer motion sensor, a gyroscopic motion sensor, a micro vibration motion sensor, a rotation vector motion sensor, a geomagnetic field motion sensor, a gravity motion sensor, or an orientation sensor.

In at least one example embodiment, the movement of the apparatus is characteristic of a user of the apparatus possessing the apparatus.

In at least one example embodiment, the movement of the apparatus is characteristic of a user of the apparatus coming into possession of the apparatus.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

An embodiment of the invention and its potential advantages are understood by referring to FIGS. 1 through 7 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

Figure 1:
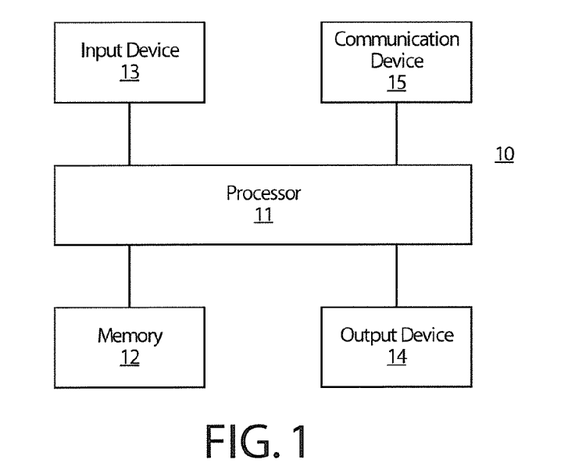
FIG. 1 is a block diagram showing an apparatus according to at least one example embodiment.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
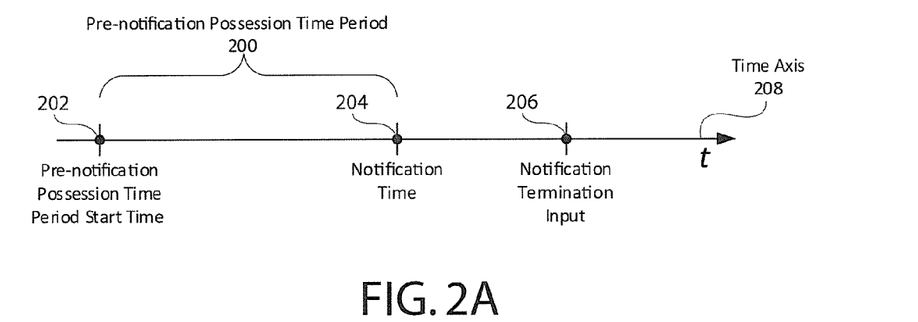
FIGS. 2A-2B are diagrams showing a pre-notification possession time period according to at least one example embodiment.
Figure 2B:
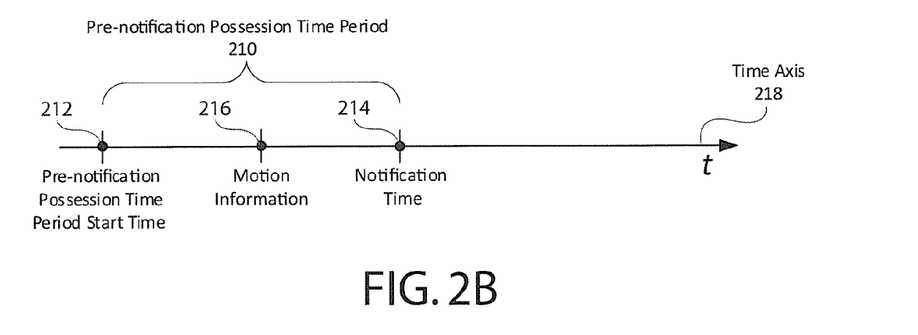

FIGS. 2A-2B are diagrams showing a pre-notification possession time period according to at least one example embodiment. The examples of FIGS. 2A-2B are merely examples and do not limit the scope of the claims. For example, pre-notification possession time period duration may vary, notification termination input time may vary, temporal arrangement may vary, and/or the like.

As electronic apparatuses become more prevalent and more pervasive in society, users of electronic apparatus have become increasingly reliant upon and dependent upon their electronic apparatuses. For example, a user of an electronic apparatus may utilize the electronic apparatus for purposes relating to navigation, scheduling, entertainment, communication, appointment management, socialization, and/or the like. For example, the user may utilize the electronic apparatus to receive business communications, to receive personal emails, to interact socially with other users, to navigate a route to a destination, and/or the like. As such, it has become increasingly important that a user of an apparatus is in possession of the apparatus so that the user may utilize the apparatus in association with various aspects of the life of the user. In many circumstances, it may be desirable to ensure that a user of an electronic apparatus is in possession of the electronic apparatus prior to the user departing the user's residence, before leaving a place of business, and/or the like.

In at least one example embodiment, an apparatus is associated with an apparatus possession alarm. The apparatus possession alarm may be an alarm that alerts a user of an apparatus to pick up the apparatus, to take the apparatus with the user prior to departing a location, to come into possession of the apparatus, and/or the like. For example, the apparatus possession alarm may remind the user to pick up the apparatus, to stow the apparatus in a purse, and/or the like. In this manner, the apparatus possession alarm may assist in ensuring that the user of the apparatus is in possession of the apparatus prior to a certain time. In at least one example embodiment, an apparatus possession alarm is associated with a notification time. The notification time may be a time associated with actuation of a notification, rendering of a notification, and/or the like. The notification time may be a discrete time, a time of day, a durational time, and/or the like. The notification may by associated with visual information, auditory information, a tactile information, and/or the like. The notification may be similar as described regarding the example of FIG. 3A.

In many circumstances, a user may desire actuation of a notification to occur at a chronologically accurate point in time. For example, a user may desire a notification associated with an apparatus possession alarm to be actuated at a notification time, to be actuated after a pre-notification possession time period has elapsed, and/or the like. In at least one example embodiment, an apparatus comprises at least one hardware timer. For example, the hardware timer may be a digital counter that increments at a fixed frequency, decrements at a fixed frequency, and/or the like. In at least one example embodiment, a hardware timer compares a timer value against a specific value. For example, the hardware timer may compare a timer value associated with elapsed time against a pre-notification possession time period. In at least one example embodiment, a pre-notification possession time period is satisfied when an associated timer value meets or exceeds the duration of the pre-notification possession time period. In at least one example embodiment, an apparatus comprises a software timer. For example, the apparatus may utilize a hardware timer to implement one or more software timers. In at least one example embodiment, a hardware timer is set to expire when a software timer is due to expire. In such an example embodiment, upon joint expiration of the hardware timer and software timer, the hardware timer may be set to expire when a different software timer is due to expire, such that the hardware timer supports implementation of one or more software timers. In at least one example embodiment, an apparatus comprises at least one hardware clock, at least one software clock, and/or the like. The apparatus may determine a current time based, at least in part, on the hardware clock, the software clock, and/or the like.

In many circumstances, a user may commonly pick up an electronic apparatus within a specific time frame prior to departing a location, prior to leaving an office, before departing to exercise, and/or the like. For example, the user of the electronic apparatus may often plug the electronic apparatus into a charger at night. In such an example, the user may retrieve the electronic apparatus from the charging location prior to departing for work each morning. In such an example, if the user usually leaves the user's residence at 08:00, the user may commonly retrieve the electronic apparatus and come into possession of the electronic apparatus at some time between 07:50 and 08:00. In this manner, it may be desirable to associate an apparatus possession alarm with a durational time period prior to rendering of a notification at a notification time. In at least one example embodiment, an apparatus possession alarm is associated with a pre-notification time period. In at least one example embodiment, a pre-notification possession time period is a duration of time prior to a notification time associated with an apparatus possession alarm. The pre-notification possession time period may be a duration of time during which a user of the apparatus is expected to possess the apparatus, during which a user of the apparatus is expected to come into possession of the apparatus, and/or the like. In at least one example embodiment, a pre-notification time period is associated with a pre-notification time period start time. For example, the pre-notification time period start time may be a discrete time from which the pre-notification time period begins. In such an example, the pre-notification time period may end at a discrete time associated with a notification time.

In many circumstances, a user may desire to enable a particular apparatus possession alarm. For example, the user may commonly leave for work at 8:00, and may desire to enable an apparatus possession alarm that may be associated with a notification time of 8:00 and a pre-notification possession time period of 10 minutes. In another example, the user may often leave to exercise at 18:00. In such an example, the user may desire to enable an apparatus possession alarm that may be associated with a notification time of 17:55 and a pre-notification possession time period of 5 minutes. As such, the notification time may be a time prior to a planned departure time, prior to a time that the user commonly leaves a specific location, and/or the like. In such circumstances, the user may desire to enable one or more apparatus possession alarms such that the user may be reminded to be in possession of the apparatus at a particular time. In at least one example embodiment, an apparatus receives information indicative of an apparatus possession alarm enablement input. In such an example embodiment, the apparatus may cause storage of the apparatus possession alarm in memory such that the apparatus possession alarm is associated with the notification time, the pre-notification possession time period, and/or the like. In such an example embodiment, the apparatus may store the information associated with the apparatus possession alarm in at least one memory comprised by the apparatus, in a data structure, in a database, and/or the like, such that the apparatus may retrieve the information associated with the apparatus possession alarm, perform operations in conformance with the information associated with the apparatus possession alarm, and/or the like.

In order to facilitate performance of operations associated with an apparatus possession alarm, it may be desirable to configure an apparatus such that the apparatus may determine whether a user is in possession of an electronic apparatus, whether the user comes into possession of the electronic apparatus prior to the notification time, whether the user possesses the electronic apparatus at a time within a pre-notification possession time period, and/or the like. In such an example, it may be desirable to provide for the determination of possession of the apparatus in a manner that is easy and intuitive for the user of the apparatus. In at least one example embodiment, the determination of a user's possession of an apparatus is based, at least in part, on motion information associated with the apparatus. In at least one example embodiment, an apparatus receives motion information indicative of movement of the apparatus. In at least one example embodiment, the motion information is received by way of at least one motion sensor comprised by the apparatus. The motion sensor may be an accelerometer motion sensor, a gyroscopic motion sensor, a micro vibration motion sensor, a rotation vector motion sensor, a geomagnetic field motion sensor, a gravity motion sensor, an orientation sensor, and/or the like. The movement of the apparatus may be characteristic of a user of the apparatus possessing the apparatus, of the user of the apparatus coming into possession of the apparatus, and/or the like. For example, the motion information may indicate that the apparatus has been picked up by a user, that the apparatus is being carried by the user, and/or the like.

In many circumstances, a notification may be actuated based, at least in part, on a time of day, a day of the week, and/or the like. As such, it may be desirable to configure an apparatus such that the apparatus may determine a time of day, a day of the week, and/or the like. In at least one example embodiment, an apparatus, determines that a current time is within a pre-notification possession time period associated with an apparatus possession alarm. As such, if the current time associated with receipt of motion information indicative of movement of the apparatus is within the pre-notification possession time period, the apparatus may determine that the user of the apparatus is in possession of the apparatus. Similarly, if the apparatus fails to receive motion information indicative of movement of the apparatus at a current time within a pre-notification possession time period, the apparatus may determine that the user of the apparatus fails to be in possession of the apparatus at the current time within the pre-notification possession time period.

In many circumstances, an electronic apparatus may be powered by a battery. In such circumstances, it may be desirable to conserve battery power such that the apparatus may be functional for an extended period of time. As such, it may be desirable to limit performance of specific power-intensive operations, to restrict power consumption by way of expendable sensor utilization, and/or the like. In at least one example embodiment, an apparatus initiates motion information monitoring based, at least in part, on the determination that a current time is within a pre-notification possession time period.

In some circumstances, an apparatus may fail to receive motion information indicative of movement of the apparatus prior to the notification time, within the pre-notification possession time period, and/or the like. For example, the user may have forgotten to pick up the user's electronic apparatus, may have neglected to place the electronic apparatus in a purse or briefcase, and/or the like. In at least one example embodiment, an apparatus determines that the pre-notification possession time period has elapsed absent receipt of motion information indicative of movement of the apparatus. In such an example embodiment, the determination that the pre-notification possession time period has elapsed absent receipt of motion information indicative of movement of the apparatus may be indicative of the user failing to be in possession of the apparatus, the user failing to come into possession of the apparatus within the pre-notification possession time period, and/or the like.

As discussed previously, in such circumstances, it may be desirable to prompt the user to pick up the apparatus, alert the user that the user may be forgetting to take the apparatus with the user, and/or the like. In at least one example embodiment, an apparatus causes rendering of a notification at the notification time. In such an example embodiment, rendering of the notification at the notification time may be based, at least in part, on the determination that the pre-notification possession time period elapsed absent receipt of the motion information. For example, rendering of the notification at the notification time may be based, at least in part, on the determination that the user fails to be in possession of the apparatus during the pre-notification possession time period, fails to come into possession of the apparatus during the pre-notification possession time period, fails to come into possession of the apparatus prior to the notification time, and/or the like. The notification may be associated with visual information, auditory information, a tactile information, and/or the like. Rendering of the notification may comprise displaying of the visual information on a display, playing of the auditory information by way of at least one speaker, producing tactile feedback in conformance with the tactile information, and/or the like. In this manner, the causation of rendering of the notification at the notification time may be based, at least in part, on the apparatus possession alarm enablement input. For example, absent receive of information indicative of the apparatus possession alarm enablement input, the apparatus may preclude causation of rendering of the notification. The notification may be similar as described regarding the example of FIG. 3A.

In many circumstances, a user may come into possession of the user's electronic apparatus subsequent to rendering of the notification at the notification time. For example, the user may hear auditory information played by way of a speaker, may perceive visual information indicated by way of a light emitting diode, a display, etc., and/or the like. In such an example, the user may be reminded to pick up the user's electronic apparatus, to come into possession of the electronic apparatus, and/or the like. In such circumstances, the user may desire to terminate rendering of the notification. For example, the user may desire to terminate the display of visual information associated with the notification, to terminate playing of auditory information associated with the notification, and/or the like.

In some circumstances, the user may desire to explicitly indicate the user's desire to cause termination of rendering of the notification. In at least one example embodiment, an apparatus receives information indicative of a notification termination input. In such an example embodiment, the receipt of the notification termination input may be subsequent to the causation of rendering of the notification. In at least one example embodiment, the apparatus causes termination of rendering of the notification based, at least in part, on the notification termination input. In at least one example embodiment, the notification termination input is distinct from the motion information. For example, the notification termination input may be an input associated with a touch display comprised by the apparatus, may be an input associated with one or more physical buttons comprised by the apparatus, and/or the like.

In some circumstances, the user may desire to have the apparatus cause termination of rendering of the notification based, at least in part, on the user picking up the apparatus, the user coming into possession of the apparatus, and/or the like. For example, the user may desire to have rendering of the notification terminate automatically based, at least in part, on movement of the apparatus that is indicative of the user picking up the apparatus, the user coming into possession of the apparatus, and/or the like. In at least one example embodiment, an apparatus receives motion information indicative of a movement of the apparatus subsequent to causation of rendering of a notification. For example, the apparatus may cause rendering of a notification and, subsequently, a user of the apparatus picks the apparatus up and places the apparatus in the user's pocket. In such an example, the apparatus may cause termination of rendering of the notification based, at least in part, on the receipt of the motion information. For example, the apparatus may determine that the user has possession of the apparatus based, at least in part, on the receipt of the motion information. In such an example, the apparatus may cause termination of rendering of the notification based, at least in part, on the determination that the user has possession of the apparatus.

FIG. 2A is a diagram showing a pre-notification possession time period according to at least one example embodiment. In the example of FIG. 2A, an apparatus is associated with an apparatus possession alarm. As depicted in the example of FIG. 2A, the possession alarm is associated with pre-notification possession time period 200 and notification time 204, which are depicted in relation to time axis 208. In the example of FIG. 2A, pre-notification possession time period 200 begins at pre-notification possession time period start time 202. For example, notification time 204 may be 08:00, and pre-notification possession time period 200 may be 15 minutes. As such, in such an example, pre-notification possession time period start time 202 may be 15 minutes prior to notification time 204, or 07:45. In the example of FIG. 2A, the apparatus fails to receive motion information indicative of movement of the apparatus within pre-notification possession time period 200. As such, in the example of FIG. 2A, the apparatus causes rendering of a notification associated with the apparatus possession alarm at notification time 204. Subsequent to rendering of the notification associated with the apparatus possession alarm at notification time 204, as can be seen in the example of FIG. 2A, the apparatus receives information indicative of notification termination input 206. For example, a user of the apparatus may hear the apparatus playing auditory information associated with the notification, may come into possession of the apparatus, and may indicate a desire to cause termination of playing of the auditory information by way of notification termination input 206. In such an example, the apparatus may cause termination of rendering of the notification based, at least in part, on notification termination input 206.

Although the example of FIG. 2A depicts notification termination input 206, the apparatus may receive motion information indicative of movement of the apparatus subsequent to notification time 204 and subsequent to rendering of the notification. In such an example, the apparatus may cause termination of rendering of the notification based, at least in part, on the receipt of the motion information.

In many circumstances, a user may enable an apparatus possession alarm to aid in ensuring that the user is in possession of an associated apparatus prior to departure. In such circumstances, the user may often remember to pick up the apparatus without the aid of the apparatus possession alarm, prior to the notification time, within the pre-notification possession time period, and/or the like. In such circumstances, the user may desire to prevent rendering of the notification as the user fails to require prompting to pick up the apparatus, is already in possession of the apparatus, and/or the like. For example, the user may desire to avoid playing of auditory information associated with the notification, may desire to preclude displaying of visual information associated with the notification, and/or the like. In at least one example embodiment, an apparatus receives motion information indicative of movement of the apparatus prior to the notification time. In such an example embodiment, the apparatus may determine that a user has possession of the apparatus based, at least in part, on the receipt of the motion information. As discussed previously, in order to facilitate conservation of battery power and/or limited power resources, it may be desirable to discontinue motion information monitoring once the apparatus has determined that the user is in possession of the apparatus. As such, in at least one example embodiment, an apparatus terminates motion information monitoring based, at least in part, on the receipt of the motion information.

In at least one example embodiment, an apparatus precludes causation of rendering of a notification at the notification time based, at least in part, on the receipt of the motion information. For example, the preclusion of causation of rendering of the notification at the notification time may be based, at least in part, on the determination that the user has possession of the apparatus by the notification time, prior to the notification time, during the pre-notification possession time period, and/or the like. As such, the pre-notification possession time period may be a duration of time during which receipt of the motion information indicative of the movement of the apparatus causes, at least in part, the preclusion of causation of rendering of the notification at the notification time. In at least one example embodiment, the preclusion of causation of rendering of the notification comprises disablement of the apparatus possession alarm associated with the notification, avoidance of rendering of the notification, and/or the like.

FIG. 2B is a diagram showing a pre-notification possession time period according to at least one example embodiment. In the example of FIG. 2B, an apparatus is associated with an apparatus possession alarm. As depicted in the example of FIG. 2B, the possession alarm is associated with pre-notification possession time period 210 and notification time 214, which are depicted in relation to time axis 218. In the example of FIG. 2B, pre-notification possession time period 210 begins at pre-notification possession time period start time 212. For example, notification time 214 may be 20:00, and pre-notification possession time period 210 may be 10 minutes. As such, in such an example, pre-notification possession time period start time 212 may be 10 minutes prior to notification time 214, or 19:50. In the example of FIG. 2B, the apparatus receives motion information 216 during pre-notification possession period 210. Motion information 216 may be indicative of movement of the apparatus, user possession of the apparatus, and/or the like. As such, in the example of FIG. 2B, the apparatus precludes causation of rendering of a notification associated with the apparatus possession alarm at notification time 214. For example, a user of an apparatus may unplug the apparatus from a charger and place the apparatus in the user's pocket at 19:55. In such an example, the user may desire to prevent rendering of the notification for one or more of the reasons discussed previously. As such, the apparatus may disable the apparatus possession alarm at 19:55, may preclude rendering of the notification at notification time 214, and/or the like.

In some circumstances, a user of an apparatus may enable a particular apparatus possession alarm and may subsequently desire to disable the apparatus possession alarm. For example, the schedule of the user may change, the user may be at a location that condemns rendering of auditory information that may be associated with the notification, and/or the like. In such an example, the user may desire to prevent rendering of a notification associated with an apparatus possession alarm, may desire to disable the apparatus possession alarm, and/or the like. In at least one example embodiment, an apparatus receives information indicative of an apparatus possession alarm cancellation input. The apparatus possession alarm cancellation input may cause deletion of information associated with the apparatus possession alarm from memory, may preclude a single occurrence of causation of rendering of a notification associated with the apparatus possession alarm, may preclude all occurrences of causation of rendering of a notification associated with the apparatus possession alarm, and/or the like. For example, a user may enable a recurring apparatus possession alarm that is associated with a notification time of 08:00 and a pre-notification possession time period of 10 minutes. A recurring apparatus possession alarm may be an apparatus possession alarm that causes rendering of a notification once a day at the notification time. In such an example, on the first day, the user may pick up the apparatus within the pre-notification possession time period, for example, at 07:55. In such an example, on the second day, the user may neglect to pick up the apparatus prior to the notification time. As such, the apparatus may cause rendering of the notification at 08:00. In such an example, the user may subsequently indicate a desire to disable the apparatus possession alarm by way of an apparatus possession alarm cancellation input. As such, on the third day, the apparatus may fail to cause rendering of the notification at 08:00 regardless of whether the user is in possession of the apparatus by 08:00.

Figure 3A:
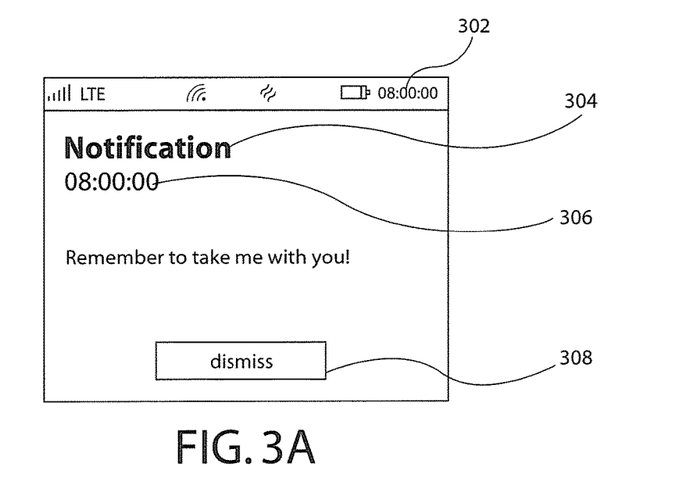
FIGS. 3A-3C are diagrams showing visual information associated with an apparatus possession alarm according to at least one example embodiment.
Figure 3B:
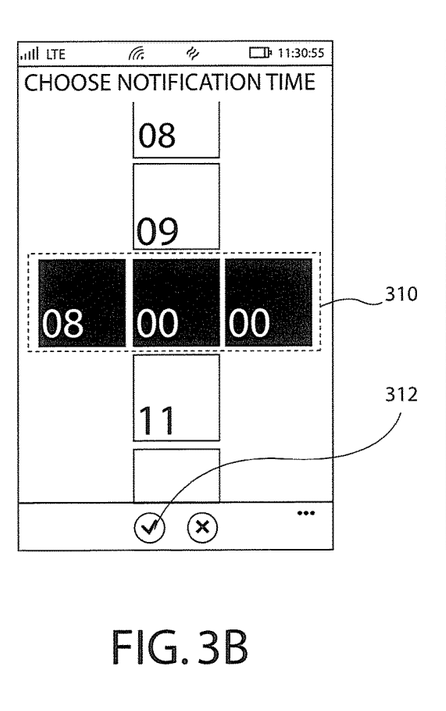
Figure 3C:
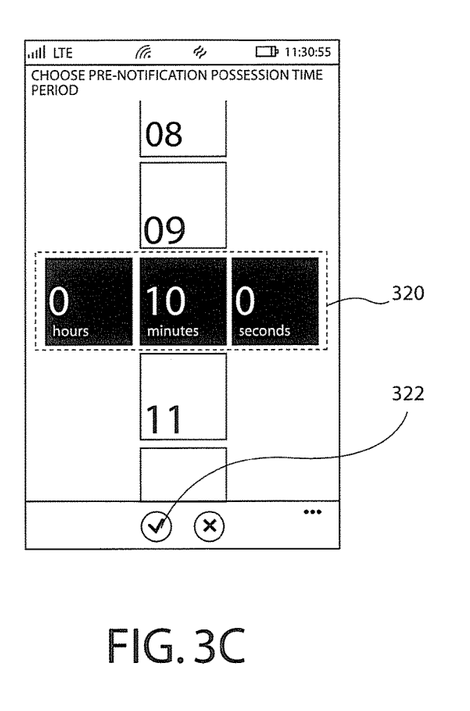

FIGS. 3A-3C are diagrams showing visual information associated with an apparatus possession alarm according to at least one example embodiment. The examples of FIGS.

3A-3C are merely examples and do not limit the scope of the claims. For example, notification content may vary, notification design may vary, notification configuration may vary, notification time selection interface configuration may vary, pre-notification possession time period acceptance interface element configuration may vary, and/or the like.

FIG. 3A is a diagram showing a notification according to at least one example embodiment. The example of FIG. 3A depicts visual information associated with a notification. In the example of FIG. 3A, the notification is associated with an apparatus possession alarm. For example, the visual information depicted in the example of FIG. 3A comprises visual information 304, which is a representation of the word "Notification." The visual information may also comprise additional visual information, such as the representation of the phrase "Remember to take me with you!" In the example of FIG. 3A, notification 304 is associated with notification time 306. As can be seen in the example of FIG. 3A, notification time 306 is 08:00:00. In the example of FIG. 3A, current time 302 is 08:00:00. As such, the visual information that is depicted in the example of FIG. 3A may be caused to be displayed on a display based, at least in part, on current time 302 corresponding with notification time 306.

Although the example of FIG. 3A depicts visual information associated with a notification being displayed on a display, the notification may be associated with auditory information, tactile information, and/or the like, in addition to or instead of the depicted visual information. For example, the notification may be associated with auditory information, and the causation of rendering of the auditory information may comprise playing of the auditory information by way of a speaker.

In many circumstances, a user of an apparatus may desire to enable a particular apparatus possession alarm. For example, the user may desire to indicate a particular notification time, a particular pre-notification possession time period, and/or the like. As such, it may be desirable to configure an apparatus such that the user of the apparatus may quickly and intuitively indicate one or more characteristics of an apparatus possession alarm, set one or more values associated with the apparatus possession alarm, and/or the like.

In at least one example embodiment, an apparatus causes display of at least one notification time selection interface element. The notification time selection interface element may be an interface element configured to permit a user of the apparatus to indicate that a selected time is the notification time. In such an example embodiment, the apparatus may receive information indicative of a notification time selection input associated with the notification time selection interface element. For example, the notification time selection input may be at a position that corresponds with a position of display of the notification time selection interface element. The notification time may be based, at least in part, on the notification time selection input. The notification time selection input may be an input that indicates selection of a specific notification time, changing of a notification time to a different notification time, and/or the like.

In order to facilitate setting of the notification time and enablement of the associated apparatus possession alarm, it may be desirable to allow the user to indicate that a selected time is the notification time. In at least one example embodiment, an apparatus receives information indicative of a notification time acceptance input. For example, the apparatus may cause display of a notification time acceptance interface element in relation to the notification time selection interface element. In such an example, the notification time acceptance input may be at a position that corresponds with a position of display of the notification time acceptance interface element. As such, the apparatus may cause storage of the notification time based, at least in part, on the notification time acceptance input. The notification time may be stored such that the notification time is associated with a specific apparatus possession alarm, such that the apparatus may perform causation of rendering of the notification at the notification time, and/or the like.

FIG. 3B is a diagram showing a notification time selection interface element according to at least one example embodiment. The example of FIG. 3B depicts visual information associated with notification time selection interface element 310 and notification time acceptance interface element 312. In the example of FIG. 3B, notification time selection interface element 310 comprises three individual interface elements corresponding with hours, minutes, and seconds. For example, a user may indicate a particular time of day identified by way of the hour, minute, and/or second by way of notification time selection interface element 310. As can be seen, in the example of FIG. 3B, notification time selection interface element 310 indicates a notification time of 08:00:00. Although the example of FIG. 3B depicts an interface element associated with identification of a second, in at least one example embodiment, notification time selection interface element 310 is absent an interface element associated with identification of a second. If the user desires to create an apparatus possession alarm associated with a notification time of 08:00:00, the user may indicate such a desire by way of a notification time acceptance input. For example, the notification time acceptance input may be at a position that corresponds with a position of display of notification time acceptance interface element 312.

In at least one example embodiment, an apparatus causes display of at least one pre-notification possession time period selection interface element. The pre-notification possession time period selection interface element may be an interface element configured to permit a user of the apparatus to indicate that a selected duration is the pre-notification possession time period, that a selected time is the pre-notification possession time period start time, and/or the like. In such an example embodiment, the apparatus may receive information indicative of a pre-notification possession time period selection input associated with the pre-notification possession time period selection interface element. For example, the pre-notification possession time period selection input may be at a position that corresponds with a position of display of the pre-notification possession time period selection interface element. The pre-notification possession time period may be based, at least in part, on the pre-notification possession time period selection input. The pre-notification possession time period selection input may be an input that indicates selection of a specific pre-notification possession time period, selection of a particular pre-notification possession time period start time, changing of a pre-notification possession time period to a different pre-notification possession time period, and/or the like.

In order to facilitate setting of the pre-notification possession time period and enablement of the associated apparatus possession alarm, it may be desirable to allow the user to indicate that a selected duration is the pre-notification possession time period, that an indicated time is the pre-notification possession time period start time, and/or the like. In at least one example embodiment, an apparatus receives information indicative of a pre-notification possession time period acceptance input. For example, the apparatus may cause display of a pre-notification possession time period acceptance interface element in relation to the pre-notification possession time period selection interface element. In such an example, the pre-notification possession time period acceptance input may be at a position that corresponds with a position of display of the pre-notification possession time period acceptance interface element. As such, the apparatus may cause storage of the pre-notification possession time period based, at least in part, on the pre-notification possession time period acceptance input. The pre-notification possession time period may be stored such that the pre-notification possession time period is associated with a specific apparatus possession alarm, such that the apparatus may perform initiation of motion information monitoring at the pre-notification possession time period state time, and/or the like. The pre-notification possession time period may be stored as a discrete time that corresponds with the pre-notification possession time period start time, as a durational time that corresponds with the pre-notification possession time period, and/or the like.

FIG. 3C is a diagram showing a pre-notification possession time period selection interface element according to at least one example embodiment. The example of FIG. 3C depicts visual information associated with pre-notification possession time period selection interface element 320 and pre-notification possession time period acceptance interface element 322. In the example of FIG. 3C, pre-notification possession time period selection interface element 320 comprises three individual interface elements corresponding with hours, minutes, and seconds. For example, a user may indicate a particular duration that may be identified by way of the hour, minute, and/or second by way of pre-notification possession time period selection interface element 320. As can be seen, in the example of FIG. 3C, pre-notification possession time period selection interface element 320 indicates a pre-notification possession time period of 10 minutes. The example of FIG. 3C may correspond with the example of FIG. 3B. For example, the visual information depicted in FIG. 3C may represent visual information that may be displayed subsequent to receipt of a notification time acceptance input by way of notification time acceptance interface element 312 of FIG. 3B. As such, the pre-notification possession time period of 10 minutes may indicate a pre-notification possession time period start time of 07:50:00, may indicate a pre-notification possession time period of 10 minutes prior to 08:00:00, and/or the like.

Although the example of FIG. 3C depicts an interface element associated with identification of a second, in at least one example embodiment, pre-notification possession time period selection interface element 320 is absent an interface element associated with identification of a second. If the user desires to create an apparatus possession alarm associated with a pre-notification possession time period of 10 minutes, the user may indicate such a desire by way of a pre-notification possession time period acceptance input. For example, the pre-notification possession time period acceptance input may be at a position that corresponds with a position of display of pre-notification possession time period acceptance interface element 322.

Figure 4:
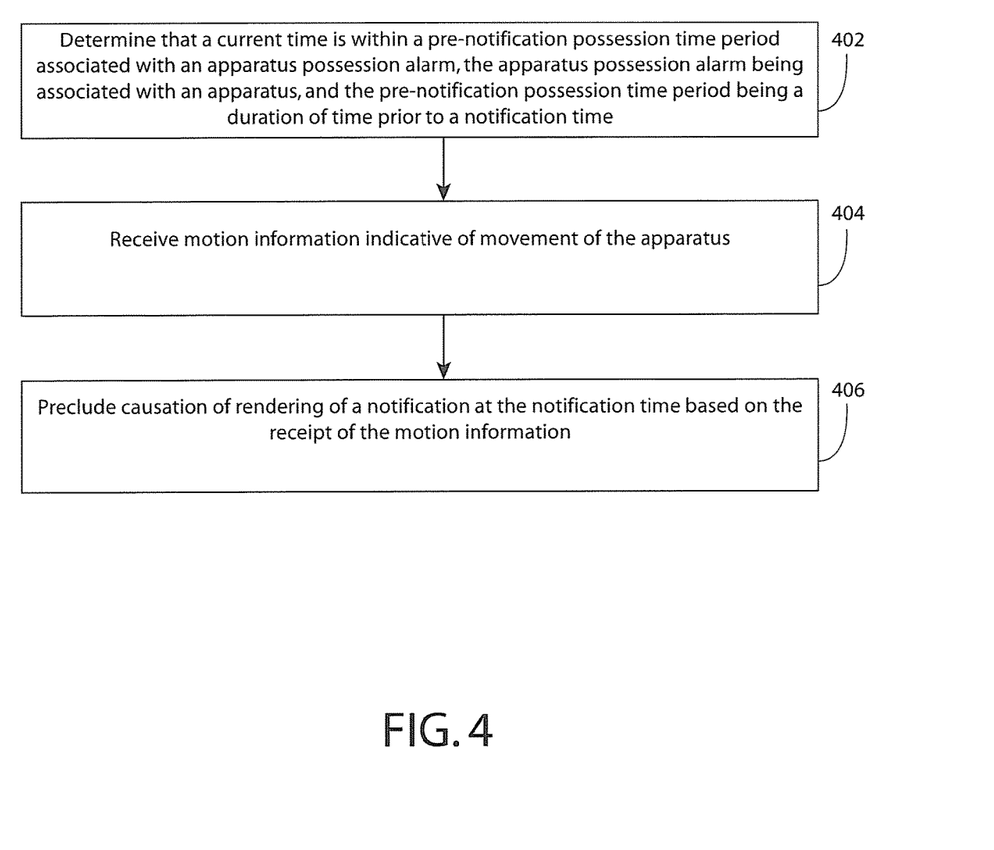
FIG. 4 is a flow diagram illustrating activities associated with preclusion of causation of rendering of a notification at a notification time according to at least one example embodiment.

FIG. 4 is a flow diagram illustrating activities associated with preclusion of causation of rendering of a notification at a notification time according to at least one example embodiment. In at least one example embodiment, there is a set of operations that corresponds with the activities of FIG. 4. An apparatus, for example electronic apparatus 10 of FIG. 1, or a portion thereof, may utilize the set of operations. The apparatus may comprise means, including, for example processor 11 of FIG. 1, for performance of such operations.

In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 4.

At block 402, the apparatus determines that a current time is within a pre-notification possession time period associated with an apparatus possession alarm. In at least one example embodiment, the apparatus possession alarm is associated with an apparatus. In at least one example embodiment, the pre-notification possession time period is a duration of time prior to a notification time associated with the apparatus possession alarm. The apparatus, the determination, the current time, the pre-notification possession time period, the apparatus possession alarm, the notification time, and the duration of time prior to the notification time may be similar as described regarding FIGS. 2A-2B and FIGS. 3A-3C.

At block 404, the apparatus receives motion information indicative of movement of the apparatus. The receipt, the motion information, and the movement of the apparatus may be similar as described regarding FIGS. 2A-2B and FIGS. 3A-3C.

At block 406, the apparatus precludes causation of rendering of a notification at the notification time based, at least in part, on the receipt of the motion information. The preclusion, the causation, the rendering, and the notification may be similar as described regarding FIGS. 2A-2B and FIGS. 3A-3C.

Figure 5:
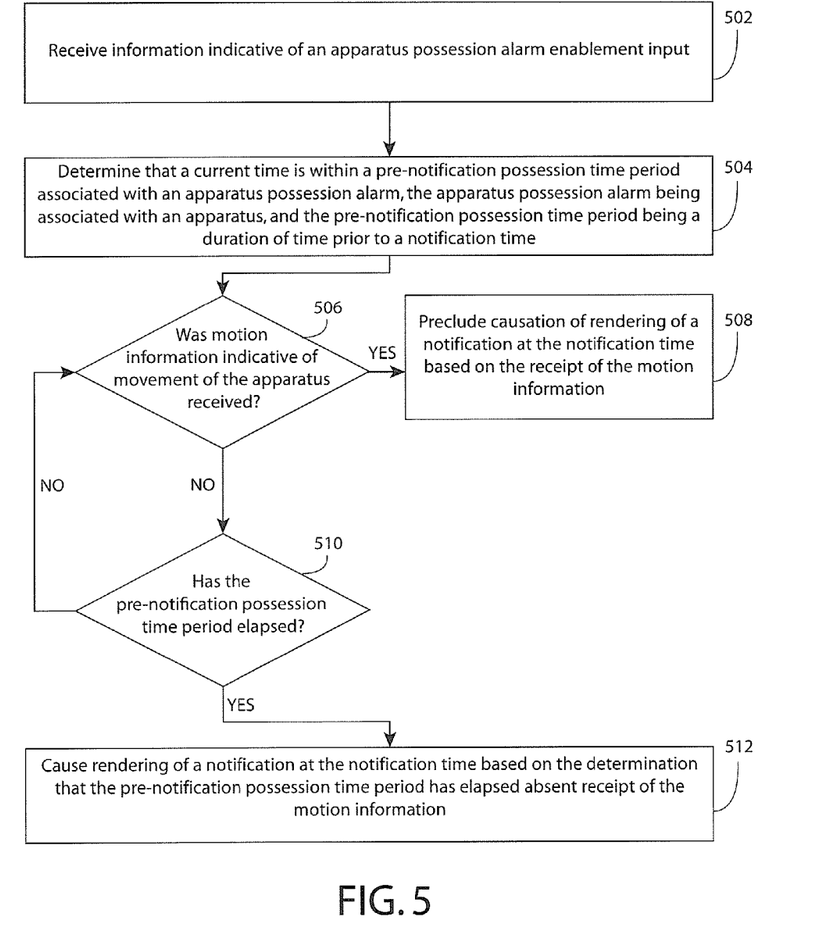
FIG. 5 is a flow diagram illustrating activities associated with determination of whether a pre-notification possession time period has elapsed absent receipt of motion information indicative of movement of an apparatus according to at least one example embodiment.

FIG. 5 is a flow diagram illustrating activities associated with determination of whether a pre-notification possession time period has elapsed absent receipt of motion information indicative of movement of an apparatus according to at least one example embodiment. In at least one example embodiment, there is a set of operations that corresponds with the activities of FIG. 5. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 5.

As discussed previously, in many circumstances, it may be desirable to cause rendering of a notification based, at least in part, on a determination that a pre-notification possession time period has elapsed absent receipt of motion information indicative of movement of an apparatus.

At block 502, the apparatus receives information indicative of an apparatus possession alarm enablement input. The receipt and the apparatus possession alarm enablement input may be similar as described regarding FIGS. 2A-2B and FIGS. 3A-3C.

At block 504, the apparatus determines that a current time is within a pre-notification possession time period associated with an apparatus possession alarm. In at least one example embodiment, the apparatus possession alarm is associated with an apparatus. In at least one example embodiment, the pre-notification possession time period is a duration of time prior to a notification time associated with the apparatus possession alarm. The apparatus, the determination, the current time, the pre-notification possession time period, the apparatus possession alarm, the notification time, and the duration of time prior to the notification time may be similar as described regarding FIGS. 2A-2B and FIGS. 3A-3C.

At block 506, the apparatus determines whether motion information indicative of movement of the apparatus has been received. If the apparatus determines that motion information indicative of movement of the apparatus has been received, flow proceeds to block 508. If the apparatus determines that motion information indicative of movement of the apparatus has not been received, flow proceeds to block 510. The determination, the motion information, and the movement of the apparatus may be similar as described regarding FIGS. 2A-2B and FIGS. 3A-3C.

At block 508, the apparatus precludes causation of rendering of a notification at the notification time based, at least in part, on the receipt of the motion information. In this manner, the preclusion of causation of rendering of a notification at the notification time based, at least in part, on the determination that motion information indicative of movement of the apparatus has been received. The preclusion, the causation, the rendering, and the notification may be similar as described regarding FIGS. 2A-2B and FIGS. 3A-3C.

At block 510, the apparatus determines whether the pre-notification possession time period has elapsed. If the apparatus determines that the pre-notification possession time period has elapsed, flow proceeds to block 512. If the apparatus determines that the pre-notification possession time period has failed to elapse, flow returns to block 506. The determination may be similar as described regarding FIGS. 2A-2B and FIGS. 3A-3C.

At block 512, the apparatus causes rendering of a notification at the notification time based, at least in part, on the determination that the pre-notification possession time period has elapsed absent receipt of the motion information. In this manner, the causation of rendering of the notification at the notification time may be based, at least in part, on the determination that the pre-notification possession time period has elapsed. The causation, the rendering, and the notification may be similar as described regarding FIGS. 2A-2B and FIGS. 3A-3C.

Figure 6:
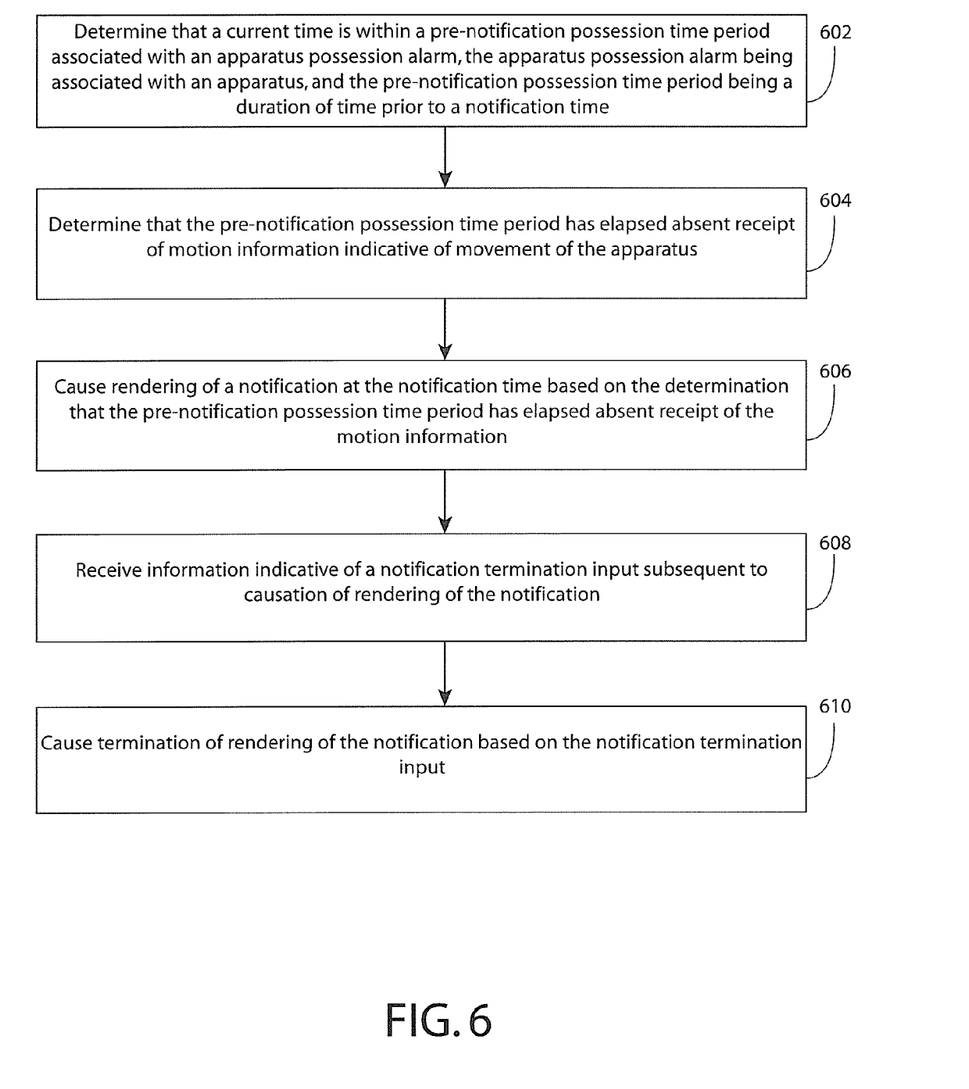
FIG. 6 is a flow diagram illustrating activities associated with causation of termination of rendering of a notification according to at least one example embodiment.

FIG. 6 is a flow diagram illustrating activities associated with causation of termination of rendering of a notification according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

As discussed previously, in many circumstances, an apparatus may cause rendering of a notification at a notification time based, at least in part, on a determination that a pre-notification possession time period has elapsed absent receipt of notion information indicative of movement of the apparatus. In such circumstances, a user of the apparatus may desire to be permitted to terminate rendering of the notification. As such, it may be desirable to configure an apparatus such that the apparatus may cause termination of rendering of a notification based, at least in part, on receipt of information indicative of a user's desire to discontinue rendering of the notification.

At block 602, the apparatus determines that a current time is within a pre-notification possession time period associated with an apparatus possession alarm. In at least one example embodiment, the apparatus possession alarm is associated with an apparatus. In at least one example embodiment, the pre-notification possession time period is a duration of time prior to a notification time associated with the apparatus possession alarm. The apparatus, the determination, the current time, the pre-notification possession time period, the apparatus possession alarm, the notification time, and the duration of time prior to the notification time may be similar as described regarding FIGS. 2A-2B and FIGS. 3A-3C.

At block 604, the apparatus determines that the pre-notification possession time period has elapsed absent receipt of motion information indicative of movement of the apparatus. The determination, the elapsing of the pre-notification possession time period, the receipt, and the motion information may be similar as described regarding FIGS. 2A-2B and FIGS. 3A-3C.

At block 606, the apparatus causes rendering of a notification at the notification time based, at least in part, on the determination that the pre-notification possession time period has elapsed absent receipt of the motion information. The causation, the rendering, and the notification may be similar as described regarding FIGS. 2A-2B and FIGS. 3A-3C.

At block 608, the apparatus receives information indicative of a notification termination input subsequent to causation of rendering of the notification. The receipt and the notification termination input may be similar as described regarding FIGS. 2A-2B and FIGS. 3A-3C.

At block 610, the apparatus causes termination of rendering of the notification based, at least in part, on the notification termination input. The causation and the termination of rendering may be similar as described regarding FIGS. 2A-2B and FIGS. 3A-3C.

Figure 7:
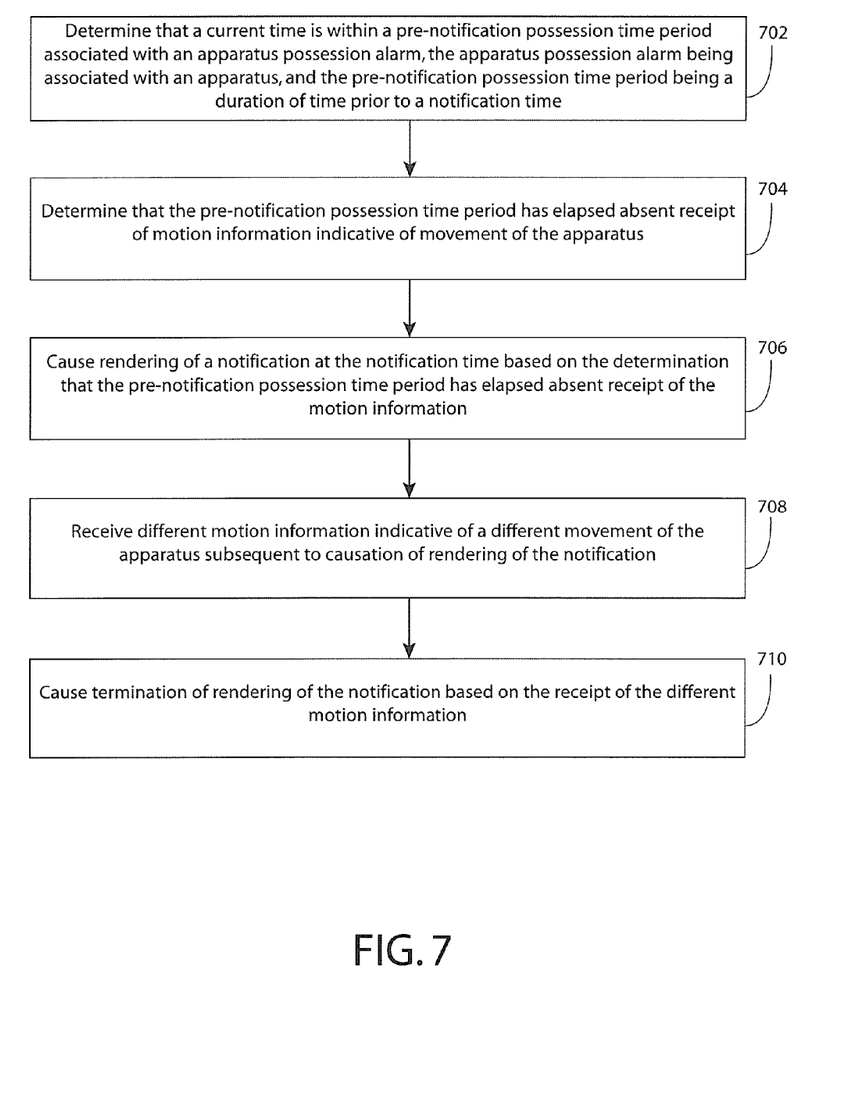
FIG. 7 is a flow diagram illustrating activities associated with causation of termination of rendering of a notification according to at least one example embodiment.

FIG. 7 is a flow diagram illustrating activities associated with causation of termination of rendering of a notification according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in many circumstances, an apparatus may cause rendering of a notification at a notification time based, at least in part, on a determination that a pre-notification possession time period has elapsed absent receipt of notion information indicative of movement of the apparatus. In such circumstances, a user of the apparatus may desire rendering of the notification to terminate based, at least in part, on the user possessing the apparatus. As such, it may be desirable to configure an apparatus such that the apparatus may cause termination of rendering of a notification based, at least in part, on receipt of motion information indicative of a user possessing the apparatus.

At block 702, the apparatus determines that a current time is within a pre-notification possession time period associated with an apparatus possession alarm. In at least one example embodiment, the apparatus possession alarm is associated with an apparatus. In at least one example embodiment, the pre-notification possession time period is a duration of time prior to a notification time associated with the apparatus possession alarm. The apparatus, the determination, the current time, the pre-notification possession time period, the apparatus possession alarm, the notification time, and the duration of time prior to the notification time may be similar as described regarding FIGS. 2A-2B and FIGS. 3A-3C.

At block 704, the apparatus determines that the pre-notification possession time period has elapsed absent receipt of motion information indicative of movement of the apparatus. The determination, the elapsing of the pre-notification possession time period, the receipt, and the motion information may be similar as described regarding FIGS. 2A-2B and FIGS. 3A-3C.

At block 706, the apparatus causes rendering of a notification at the notification time based, at least in part, on the determination that the pre-notification possession time period has elapsed absent receipt of the motion information. The causation, the rendering, and the notification may be similar as described regarding FIGS. 2A-2B and FIGS. 3A-3C.

At block 708, the apparatus receives different motion information indicative of a different movement of the apparatus subsequent to causation of rendering of the notification. The receipt, the different motion information, and the different movement of the apparatus may be similar as described regarding FIGS. 2A-2B and FIGS. 3A-3C.

At block 710, the apparatus causes termination of rendering of the notification based, at least in part, on the receipt of the different motion information. The causation and the termination of rendering may be similar as described regarding FIGS. 2A-2B and FIGS. 3A-3C.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 506 of FIG. 5 may be performed after block 510 of FIG. 5. In another example, block 404 of FIG. 4 may be performance before block 402 of FIG. 4. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   determination that a current time is within a pre-notification possession time period associated with an apparatus possession alarm, the apparatus possession alarm being associated with an apparatus, and the pre-notification possession time period being a duration of time prior to a notification time associated with the apparatus possession alarm;
   initiation of motion information monitoring based, at least in part, on the determination that a current time is within a pre-notification possession time period;
   receipt of motion information indicative of movement of the apparatus; and
   preclusion of causation of rendering of a notification at the notification time based, at least in part, on the receipt of the motion information.

2. The apparatus of claim 1, wherein the memory includes computer program code configured to, working with the processor, cause the apparatus to perform determination that a user has possession of the apparatus based, at least in part, on the receipt of the motion information, wherein the preclusion of causation of rendering of the notification at the notification time is based, at least in part, on the determination that the user has possession of the apparatus.

3. The apparatus of claim 1, wherein the memory includes computer program code configured to, working with the processor, cause the apparatus to perform:
   determination that another current time is within another pre-notification possession time period associated with another apparatus possession alarm, the other apparatus possession alarm being associated with the apparatus, and the other pre-notification possession time period being a duration of time prior to another notification time associated with the other apparatus possession alarm;
   determination that the other pre-notification possession time period has elapsed absent receipt of another motion information indicative of another movement of the apparatus; and
   causation of rendering of another notification at the other notification time based, at least in part, on the determination that the other pre-notification possession time period has elapsed absent receipt of the other motion information.

4. The apparatus of claim 3, wherein the memory includes computer program code configured to, working with the processor, cause the apparatus to perform:
   receipt of information indicative of a notification termination input subsequent to causation of rendering of the other notification; and
   causation of termination of rendering of the other notification based, at least in part, on the notification termination input.

5. The apparatus of claim 3, wherein the memory includes computer program code configured to, working with the processor, cause the apparatus to perform:
   receipt of different motion information indicative of a different movement of the apparatus subsequent to causation of rendering of the other notification; and
   causation of termination of rendering of the other notification based, at least in part, on the receipt of the different motion information.

6. The apparatus of claim 5, wherein the memory includes computer program code configured to, working with the processor, cause the apparatus to perform determination that a user has possession of the apparatus based, at least in part, on the receipt of the different motion information, wherein the causation of termination of rendering of the other notification is based, at least in part, on the determination that the user has possession of the apparatus.

7. The apparatus of claim 1, wherein the memory includes computer program code configured to, working with the processor, cause the apparatus to perform termination of motion information monitoring based, at least in part, on the receipt of the motion information.

8. The apparatus of claim 1, wherein the motion information is received by way of at least one motion sensor comprised by the apparatus.

9. A method comprising:
  determining that a current time is within a pre-notification possession time period associated with an apparatus possession alarm, the apparatus possession alarm being associated with an apparatus, and the pre-notification possession time period being a duration of time prior to a notification time associated with the apparatus possession alarm;
  initiating motion information monitoring based, at least in part, on determining that a current time is within a pre-notification possession time period;
  receiving motion information indicative of movement of the apparatus; and
  precluding causation of rendering of a notification at the notification time based, at least in part, on receiving the motion information.

10. The method of claim 9, further comprising determining that a user has possession of the apparatus based, at least in part, on receiving the motion information, wherein precluding causation of rendering of the notification at the notification time is based, at least in part, on determining that the user has possession of the apparatus.

11. The method of claim 9, further comprising:
  determining that another current time is within another pre-notification possession time period associated with another apparatus possession alarm, the other apparatus possession alarm being associated with the apparatus, and the other pre-notification possession time period being a duration of time prior to another notification time associated with the other apparatus possession alarm;
  determining that the other pre-notification possession time period has elapsed absent receipt of another motion information indicative of another movement of the apparatus; and
  causing rendering of another notification at the other notification time based, at least in part, on determining that the other pre-notification possession time period has elapsed absent receipt of the other motion information.

12. The method of claim 11, further comprising:
  receiving information indicative of a notification termination input subsequent to causing rendering of the other notification; and
  causing termination of rendering of the other notification based, at least in part, on the notification termination input.

13. The method of claim 11, further comprising:
  receiving different motion information indicative of a different movement of the apparatus subsequent to causing rendering of the other notification; and
  causing termination of rendering of the other notification based, at least in part, on receiving the different motion information.

14. The method of claim 9, further comprising terminating motion information monitoring based, at least in part, on receiving the motion information.

15. At least one non-transitory computer-readable medium encoded with instructions that, when executed by a processor, perform:
  determination that a current time is within a pre-notification possession time period associated with an apparatus possession alarm, the apparatus possession alarm being associated with an apparatus, and the pre-notification possession time period being a duration of time prior to a notification time associated with the apparatus possession alarm;
  initiation of motion information monitoring based, at least in part, on the determination that a current time is within a pre-notification possession time period;
  receipt of motion information indicative of movement of the apparatus; and
  preclusion of causation of rendering of a notification at the notification time based, at least in part, on the receipt of the motion information.

16. The non-transitory computer-readable medium of claim 15, further encoded with instructions that, when executed by a processor, perform:
  determination that another current time is within another pre-notification possession time period associated with another apparatus possession alarm, the other apparatus possession alarm being associated with the apparatus, and the other pre-notification possession time period being a duration of time prior to another notification time associated with the other apparatus possession alarm;
  determination that the other pre-notification possession time period has elapsed absent receipt of another motion information indicative of another movement of the apparatus; and
  causation of rendering of another notification at the other notification time based, at least in part, on the determination that the other pre-notification possession time period has elapsed absent receipt of the other motion information.

17. The non-transitory computer-readable medium of claim 16, further encoded with instructions that, when executed by a processor, perform:
  receipt of information indicative of a notification termination input subsequent to causation of rendering of the other notification; and
  causation of termination of rendering of the other notification based, at least in part, on the notification termination input.

18. The non-transitory computer-readable medium of claim 16, further encoded with instructions that, when executed by a processor, perform:
  receipt of different motion information indicative of a different movement of the apparatus subsequent to causation of rendering of the other notification; and
  causation of termination of rendering of the other notification based, at least in part, on the receipt of the different motion information.

* * * * *